United States Patent [19]
Chiffert

[11] 3,714,545
[45] Jan. 30, 1973

[54] CURRENT TRANSFORMER CONNECTION CONTROL

[75] Inventor: Alain Chiffert, Jouy-en-Josas, France

[73] Assignee: Comteurs Schlumberger, Montrouge, France

[22] Filed: April 18, 1972

[21] Appl. No.: 245,233

[30] Foreign Application Priority Data

April 30, 1971 France..............................7115561

[52] U.S. Cl. ..........................323/6, 321/11, 323/56, 324/55
[51] Int. Cl. ............................G01r 31/06, G05f 1/22
[58] Field of Search.........324/52, 55, 117; 317/14 K; 323/6, 56; 321/11

[56] References Cited

UNITED STATES PATENTS

| 3,541,428 | 11/1970 | Schwarz | 323/56 |
| 3,543,092 | 11/1970 | Hoel | 324/52 X |
| 3,634,875 | 1/1972 | Bixby | 324/117 X |
| 3,678,377 | 7/1972 | Chiffert | 324/55 |

Primary Examiner—Gerald Goldberg
Attorney—D. C. Roylance et al.

[57] ABSTRACT

An apparatus for detecting specific conditions in a current transformer during the establishment of a short circuit current and anticipating saturation to prevent the connection of the transformer output to a utilization device. The apparatus include a voltage divider connected to the secondary winding and an integrater connected to integrate a portion of the voltage developed across the divider. The result of the integration is monitored as to direction and magnitude and an output signal is generated which is indicative of both direction and whether or not the magnitude has exceeded a predetermined threshold. This value is used as being representative of the generation of flux in the magnetic circuit. Simultaneously, the sign of the derivative of the current is determined. The signals thus generated are coupled to a circuit which performs the logical decision $S = A \cdot B + \bar{A} \cdot C$. A signal resulting from this decision inhibits connection of the transformer to the utilization device.

5 Claims, 6 Drawing Figures

CURRENT TRANSFORMER CONNECTION CONTROL

This invention relates to an apparatus for detecting the intervals of time during which the response of a saturable current transformer remains correct, and to apparatus associated therewith for the control of the connection of the transformer to protection means.

When a short circuit occurs in a network, there is an interval in the short circuit current which can be referred to as the period of establishment during which there usually appears an aperiodic component the time constant of which is that of the network operating under free conditions, and the initial amplitude of which is a function of the voltage and current in the load at the instant when the fault producing the short circuit occurs. This aperiodic component is superimposed on the sinusoidal component of the short circuit current, the sinusoidal component being the only one to remain under steady state conditions.

It can occur that a current transformer coupled to the network in which the short circuit current flows will not be saturated by the sinusoidal component of the short circuit current alone, but can be effectively saturated by the combination of the short circuit current together with the aperiodic component. When the current transformer becomes saturated, the response is no longer a proportionality, i.e., the signal in the secondary is no longer proportional to a that in the primary because the voltage peaks in the secondary are limited or otherwise distorted, and also in that the zero crossings in the secondary are no longer as they were in the unsaturated conditions. There circumstances occur when the voltage due to the ampere turns of the sinusoidal component combined with the voltage due to the ampere turns of the aperiodic component, both in the current transformer primary, bring the flux level in the magnetic circuit to a value equal to or greater than the value which determines the state of saturation. However, the response of the current transformer is quite correct and usable during those intervals of time in which the two voltages have opposite effects from each other and therefore leave the current transformer unsaturated.

Although it is possible to construct a current transformer so that the threshold of saturation of the magnetic circuit therein is never reached, even in the presence of a maximum aperiodic component in the short circuit current, it is somewhat more economical to diminish the ratings of the transformer and then limit the use of the transformer output to those intervals in which its response is correct. Thus, designed, the protection devices using the output of the current transformer can be satisfied with a signal which reproduces rather imperfectly the aperiodic component, provided that the sinusoidal component of the short circuit current is not alone enough to saturate the transformer.

The determination of those time intervals during which the response of a current transformer remains correct, even though the saturation value has been reached during other intervals, forms the subject matter of a device described in U.S. Patent Application Ser. No. 96,182, filed on Aug. 12, 1970, and entitled "-Device for Detecting the Time of Possible Saturation of a Current Transformer" now U.S. Pat. No. 3,678,377. In that application, the sign of the derivative of the secondary current and samples of the value of this derivative at those instance when the secondary current is nul is applied to a logic circuit which delivers an indication of the validity of the response of the current transformer. That indication is related to the sign of the derivative of the secondary current when the values of this derivative are very different during two consecutive zero crossings of that current, the indication being delivered only during those time intervals where the derivative has and keeps the same sign.

The means for obtaining various pieces of information, and for processing them with the logic circuit, requires rather complex circuitry which uses a large number of components.

Furthermore, the criteria of quality whose indication is delivered by the logic circuit, is only generated at the end of an interval of time equal to that which separates two consecutive zero crossings, and the indication is only reliably used, as a practical matter, after an interval twice as long. The criterion of quality of the output signal does not indicate the state of saturation until after the effective establishment of that state.

An object of the present invention is to permit the state of saturation of the current transformer to be anticipated before its effective establishment, and to permit the orientation of the inductive forces, which are the cause of this saturation, to be determined by correlating preliminary signals. It is then possible to identify in advance those time intervals during which the response of the current transformer will be correct.

Briefly described, the invention utilizes, in part, the fact that the state of saturation is closely time related to the generation of sufficient flux in the magnetic circuit of the current transformer. According to the invention, this generation is monitored to an adequate approximation by the continuous examination of the integrated value of the voltage which appears at the terminals of a fraction of a resistive load connected across the secondary of a current transformer, and the control of the connection between the current transformer and the utilization device, such as a protection device, is triggered as soon as this value reaches a threshold which is preselected in accordance with the various physical characteristics of the current transformer.

The time intervals during which the response of the current transformer is correct and characterized by, first, the generation of flux density which is lower in absolute value than the fixed saturation threshold of the transformer and, simultaneously, by the identity of the sign of the derivative of the current and the sign of the aperiodic component of this current. The influence of the aperiodic component is preponderant in the generation of the flux. Accordingly, the sign of this component does, indeed, coincide with the sign of the integral value of the voltage detected in the second area of the current transformer at the terminals of a fraction of a purely resistive load, previously mentioned.

In order that the manner in which the foregoing and other objects are attained in accordance with the invention can be understood in detail, particularly advantageous embodiments thereof will be described with reference to the accompanying drawings, which form a part of this specification, and wherein.

Figure 1A:
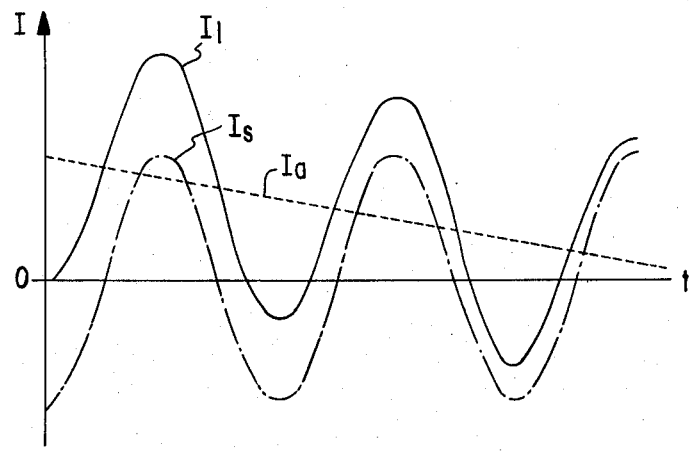
FIGS. 1A – 1C are curves of the conditions existing in a typical current transformer under conditions detectable by the present invention.

As previously described, three functions are used by the circuit of the present invention to determine the conditions of the current transformer. In order to discuss the logic function in this apparatus, the derivative of the secondary winding current will be designated by A in accordance with the sign of that parameter, so that it can be assumed that a slope of the derivative in one direction is A and a slope in the other direction is $\overline{A}$. Furthermore, the generation of flux will be represented by the logic parameters B and C which are functions of the sign of this flux and of the level of generation of the flux below or above a saturation threshold which, as previously mentioned, is determined in accordance with the construction and characteristics of the current transformer. A logic circuit which determines the conditions suitable for connection of the current transformer to the protection device must then satisfy the logic relationship;

$$S = B \cdot A + \overline{A} \cdot C$$

The device which forms the subject of the invention is thus characterized in that it includes a logic circuit of which one of the input receives a logic signal A representative of the sign of the derivative of the current and of which the other two inputs are each connected separately, via threshold detectors, to an integrator for integrating the voltage drop developed across a portion of a resistive load connected in the secondary winding circuit such that each threshold detector, taken separately, delivers a logic signal B or C characteristic of the sign of the integrated voltage and of the crossing or non-crossing of a threshold determined by the generation of the flux in the magnetic circuit of the current transformer, the logic circuit forming the logic equation $A \cdot B$ plus $\overline{A} \cdot C$.

The device, thus constructed, does not take into account any remanent induction which may remain in the magnetic circuit at the moment at which the short circuit producing fault commences in the network, which remanents can lead to a state of saturation if the generation of the flux by the short circuit current tends to increase flux in the same direction as the preexisting flux. The mere examination of the generation flux cannot, by itself, indicate the imminence of the state of saturation if such flux preexists. Thus, by device previously described can only be applied in the control of current transformers which are constructed with laminations and which are characterized by low remanent induction and which comprise in their magnetic circuits one or more air gaps, and with the further condition that before the appearance of a fault in the network a sufficient time has elapsed to permit the induction to decrease to a very low level compared to the value of the flux to be generated and detected subsequently.

This latter condition is frequently not satisfied when the cycles succeed each other at time intervals shorter than a few seconds because the duration of these intervals can be of the same order of magnitude as the time constant of these secondary circuits of the current transformers or, in some cases, can be substantially shorter.

A further feature of the invention therefore provides, in such circumstances, for the addition of a memory for each of the elements which delivers the bits of information B and C relating to the crossing of the threshold which is tied to the evolution of the flux in order to prolong the action of these bits of information for a time which fully covers the duration of two successive cycles.

Current transformers which do not have any air gaps and which are constructed of magnetic laminations of every high permeability can hold the flux field practically indefinitely at a level which is near the saturation level in the absence of load currents in their primary and secondary circuits. In such cases, the control of the connection of these currents transformers to their associated protection devices can be accomplished by a device in accordance with the present invention and which includes a memory for the bits of information B and C related to the crossing of the threshold, this memory being characterized by its substantially permanent action, on the condition that the subsequent generation of flux leads effectively to an increase over the remanent induction period.

Referring now to the figures, it will be seen that FIG. 1A shows a group of curves illustrating transformer currents as a function of time. In FIG. 1A is illustrated a sinusoidal fault current component $I_s$ and an aperiodic component $I_a$, which components act together in the primary winding, the sum thereof being represented by curve $I_1$. As will be seen, it can occur that neither $I_a$ nor $I_s$ alone might cause saturation, while the combination thereof can do so during portions of the cycles during which the aperiodic current exists.

Figure 1B:
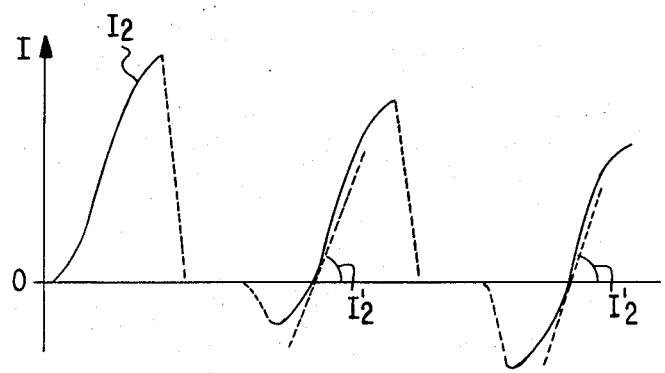

FIG. 1B shows the response in the secondary of a typical current transformer to the fault currents in F. 1A the secondary currents being identified as $I_2$. As will be seen, the response of the transformer is proper and correct during those time intervals which are diagramatically represented in FIG. 1C by shaded rectangular portions, these portions existing during the intervals between time 0 and time $t_1$, between $t_2$ and $t_3$, and between $t_4$ and $t_5$. Presumably, the aperiodic current has suitably diminished after that time and is no longer of interest.

Figure 1C:
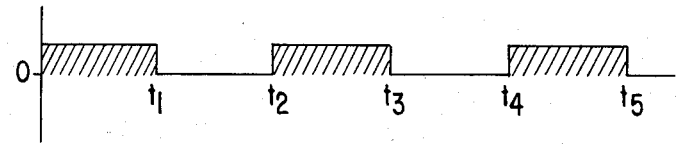

It will be noted in FIG. 1B that the slope of the secondary current, and hence the derivative $I'_2$ of the secondary currents, are identical to the sign of the aperiodic component $I_a$ during those intervals in which the response of the transformer is correct as illustrated in FIG. 1C. The slopes are indicated diagramatically at $I'_2$ in FIG. 1B.

Figure 2:
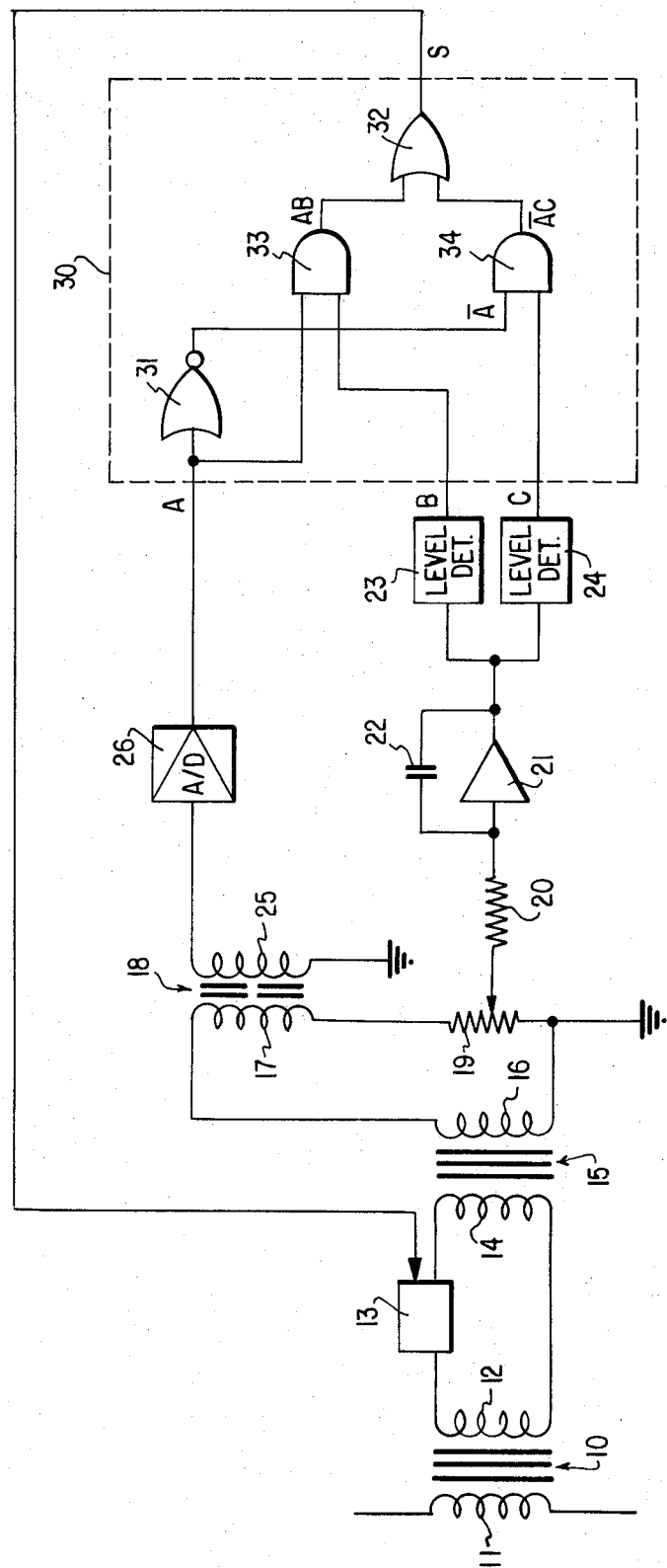
FIG. 2 is a schematic diagram, partially in block form, of an apparatus in accordance with the invention.

Turning now to FIG. 2, it will be seen that the basic apparatus in accordance with the invention includes a current transformer indicated generally at 10, having a primary winding 11 which is coupled to a high current or high voltage line to be monitored, and a secondary winding 12. Winding 12 is connected in series circuit relationship with a utilization devise 13, which includes the elements of the protection device, and with the primary winding 14 of a coupling auxiliary current transformer indicated generally at 15. The secondary winding 16 of transformer 15 is connected in series circuit relationship with a relatively small load which includes the primary winding 17 of a transformer indicated generally at 18 and a resistance element 19. Element 19 is provided with a movable contact so that a voltage can be developed across a small portion of the resistance element and coupled, through an input resistor 20, to the input of a conventional high gain operational amplifier 21. Amplifier 21 is provided with a feedback capacitor 22 connecting between the amplifier input and output terminals, which capacitor causes the apparatus to be an integrator. The output of integrating amplifier 21 constitutes a signal representative of the variation of the flux in the magnetic circuit of current transformer 10 and is coupled to threshold detectors 23 and 24 which produce, when appropriate, the output signals $B$ and $C$, previously discussed. Detector 23 monitors the generation of positive values of the flux in the current transformer and detector 24 monitors generation of negative values of the flux. One or the other of the logic signals $B$ and $C$ is then provided at the output terminal of its detector if the flux in the monitored direction exceeds the saturation threshold determined by the construction characteristics of transformer 10.

The secondary winding 25 of transformer 18 is connected between ground and an analog-to-digital converter 26 which polarity responsive and which provides a logic output having two possible levels, one level being indicative of a positive sign in the derivative of the secondary winding current of transformer 10, and the other level being indicative of a negative polarity in the derivative of that signal, this output being logic signal $A$.

The three logic signals $A$, $B$ and $C$ are applied to three inputs of a command circuit 30. Circuit 30 includes logic elements to perform the translation of the logic equation previously discussed, these elements including an inverter circuit 31 an OR gate 32 and two AND circuits 33 and 34. Input A is connected to inverter 31 and also to one input of AND circuit 33. The inverted output of 31, $\bar{A}$ is coupled to one input of the other AND circuit 34. Input B is connected to the other input of AND circuit 33 and input C is connected to the other input of AND circuit 34. The outputs of the two AND circuits are coupled to the inputs of OR circuit 32, the output of which constitutes $S$. The output $S$ can clearly occupy two levels, the $S=1$ level being indicative of saturation and being coupled back to load circuit 13 to block the connection of the secondary signal in transformer 10 from the utilization equipment because of the unreliability of the signal during that time. A logic 0 permits the transformer secondary to be connected to the utilization equipment, the logic 0 being provided during the shaded intervals previously discussed with reference with FIG. 1C.

The operation of the logic circuitry is believed to be reasonably self-evident but may be clarified by the following discussion. An output $S=1$ is desired only if the polarity of the derivative of the secondary signal and the flux level are in a direction indicative of the imminence of saturation. This can occur in either direction, either when $A$ and $B$ simultaneously exist or when $\bar{A}$ and $C$ simultaneously exist. If either of these circumstances occurs, an output will be produced by one of AND circuits 33 and 34, which output will then be coupled through OR gate 32 as the output $S$. If the circumstances do not exist, no output is produced and the secondary of the transformer is permitted to be coupled to its utilization device.

Figure 3:
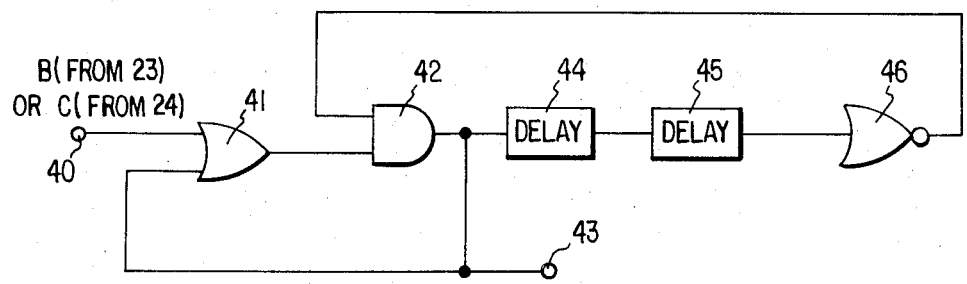
FIG. 3 is a schematic diagram of a temporary logic memory circuit in accordance with the invention and usable with the apparatus of FIG. 2.

Turning now to FIG. 3, it will be seen that this figure shows a circuit for temporarily holding in memory one of signals $B$ or $C$ to account for remnants in the current transformer 10. In FIG. 3, an input signal which constitutes either the signal B from detector 23 or signal $C$ from 24 is provided to an input terminal 40, this circuit being insertable between the appropriate detector in FIG. 2 and unit 30. The signal applied at terminal 40 is coupled to one input of an OR gate 41, the output of which is connected to one input of AND circuit 42. The output of the AND circuit is connected to an output terminal 43 which is connectable to the appropriate input of circuit 30: to the other input of OR gate 41; and to the input of a delay circuit 44. The output of delay 44 is connected to the input of another delay circuit 45, the output of which is inverted by an inverter circuit 46 and coupled back to the other input of AND circuit 42. The total delay introduced by circuits 44 and 45 is a preset fixed delay of as much as several seconds, as required, to delay the signal beyond the time required for two successive cycles of the input signal. The second delay, which reverses the logic level, avoids the overlapping of signals. The inverted output is coupled to the second input of AND circuit 42 which produces the output for circuit 30.

As will be seen when the input signal changes from logic level 0 to logic level 1, thereby indicating that the saturation threshold has been crossed and the crossing has been detected by the appropriate one of detectors 23 and 24, there appears at the output of AND circuit 42 a signal $B_t$ or $C_t$ at logic level 1. It will be recognized that, absent a previous input signal, the output of inverter 46 will provide a logic level 1 to the other input of AND circuit 42 so that a 1 input will produce an immediate 1 output. The signal at the output of AND circuit 42, and hence at output terminal 43, is maintained at level 1 by the feedback loop through or circuit 41 which holds the signal at that level even after the input at terminal 40 has been removed, and the signal remains at the level until after the delay introduced by circuits 44 and 45 has transpired. After that delay, the output of inverter 46 reduces to a 0 level, thereby removing the second level 1 input from AND circuit 42 and causing the output of AND circuit 42, and the output at terminal 43, to return to 0. Thereafter, the second input at AND circuit 42 is returned to a 1 level in readiness for the next input signal from the appropriate detector.

As will be recognized, in the usual system, a circuit such as shown in FIG. 3 will be provided for each of the outputs of detectors 23 and 24, but the circuits are identical and need not be shown twice.

Figure 4:
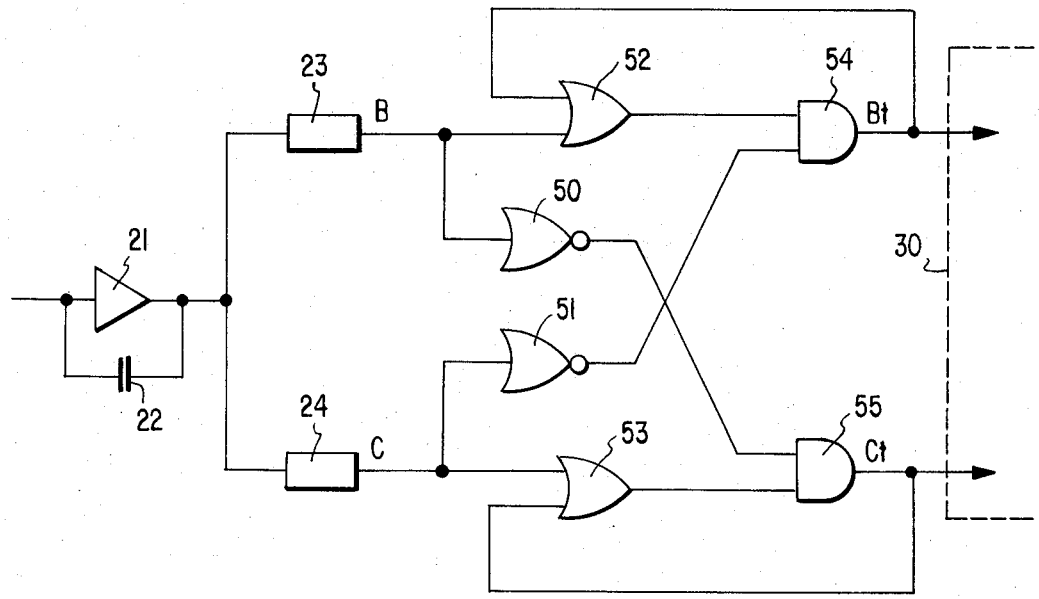
FIG. 4 is a schematic diagram, in block form, of a permanent memory in accordance with the invention and usable with the apparatus of FIG. 2.

The circuit shown in FIG. 4 permits a somewhat longer delay to be maintained. FIG. 4 shows amplifier 21 and its feedback capacitor 22 which delivers the integrated signal to detectors 23 and 24. The outputs of these detectors are then coupled to a logic circuit including inverters 50 and 51 or circuits 52 and 53 AND circuits 54 and 55, the outputs of which are coupled to the B and C inputs, respectively, of circuit 30. The output of detector 23 is connected to one input of OR circuit 52 and to invertor 50, the output of inverter 50 being connected to provide $\bar{A}$ to one input of AND circuit 55. The output of detector 24 (C) is connected to the input of inverter 51 and to input of OR circuit 53, the output of inverter 51 being connected to one input of AND circuit 54. The output of OR circuit 52 is connected to the other input of AND circuit 54 and the output of OR circuit 53 is connected to the other input of AND circuit 55, the outputs of the AND circuits being the outputs $B_t$ and $C_t$ for circuit 30 and also being coupled back to the other inputs of the associated OR circuits.

As will be seen, the delay is accomplished by a loop including OR circuit 52 and AND circuit 54 in series, for signal B, the output of the AND circuit acting to latch the OR circuit to provide a continuing output, the other AND circuit input being the inverted signal from the opposite detector. Thus, if output C is 0, a level 1 input is provided by inverter 51 to 1 input of AND circuit 54. Then, the occurrence of a level 1 at B is coupled through OR circuit 52 to the other input of AND circuit 54, producing a level 1 at $B_t$ and feeding that level back through OR circuit 52 to latch AND circuit 54 in that condition. Thus, a 1 will be held and provided to the $B_t$ input of circuit 30 for an unlimited time, regardless of the disappearance of the level 1 at the B output.

However, as soon as a level 1 appears at C, the second input for AND circuit 54 from inverter 51 will disappear, removing the remembered signal. Thus, the memorization is effective only if the generation of flux in the magnetic circuit is in the same direction as the remembered remanent flux, a condition which, as was discussed above, is necessary for a proper operation.

Clearly, the operation of the C side of the channel is the same as that previously discussed and need not be reiterated.

While certain advantageous embodiments have been chosen to illustrate the invention it will be understood by those skilled in the art that various changes and modifications can be made therein without departing from the scope of the invention as defined in the appended claims.

What is claimed is:

1. An apparatus for controlling the connection of a current transformer output to a utilization device comprising the combination of: a current transformer having a secondary winding; means coupled to said transformer secondary winding for producing a first signal representative of the sign of the derivative of the transformer secondary current; means for producing second and third signals representative of the direction and magnitude of flux generating forces in said transformer with regard to a predetermined magnitude threshold at saturation; and logic circuit means for accepting said signals and for producing an inhibiting signal to inhibit the connection of said transformer output to a utilization device whenever the combination of said signals is indicative of an interval of transformer saturation.

2. An apparatus according to claim 1 wherein said first signal is identified as A, said second and third signal are identified as B and C, respectively, said inhibiting signal is identified as S and said logic circuit means performs the decision operation $$S = A \cdot B + \bar{A} \cdot C$$

3. An apparatus according to claim 1 and further comprising memory circuit means associated with said means for producing said second and third signals, said memory means being operative to retain values of the signals produce thereby.

4. An apparatus according to claim 3 wherein said memory comprises, in series circuit relationship, an OR circuit, an AND circuit, circuit means connecting the output of said AND circuit to one input of said OR circuit, and circuit means connecting the output of said OR circuit to an input of
said AND circuit, said last mentioned means including at least one delay circuit and an inverter.

5. An apparatus according to claim 3 wherein said memory comprises an OR circuit, an AND circuit and circuit means connecting the output of said AND circuit to one input of said OR circuit and inverter circuit means for inverting one of said second and third signals and coupling said signal to the input of said OR circuit.

* * * * *